July 4, 1939.  A. AMSTUTZ  2,165,121
FEEDER
Filed June 28, 1937  2 Sheets-Sheet 1
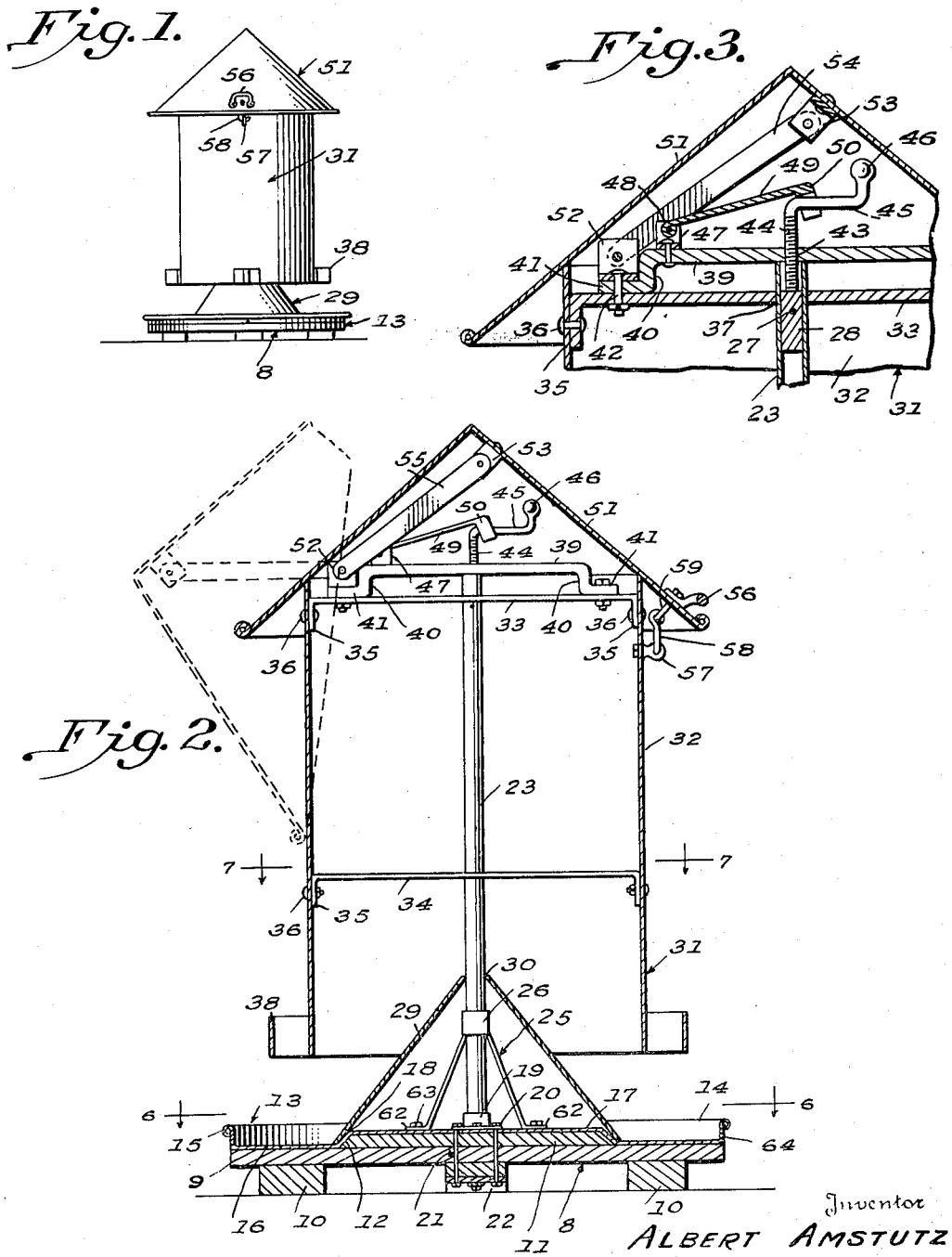
Inventor
ALBERT AMSTUTZ July 4, 1939.　　A. AMSTUTZ　　2,165,121
FEEDER
Filed June 28, 1937　　2 Sheets-Sheet 2

Inventor
ALBERT AMSTUTZ

Kimmel & Crowell
Attorneys

Patented July 4, 1939

2,165,121

UNITED STATES PATENT OFFICE 2,165,121

FEEDER

Albert Amstutz, La Rue, Ohio

Application June 28, 1937, Serial No. 150,839

1 Claim. (Cl. 119—53.5)

This invention relates to a feeder designed primarily for the feeding of hogs, but it is to be understood that a feeder in accordance with this invention may be employed in any connection for which it may be found applicable.

The invention has for its object to provide, in a manner as hereinafter set forth, a feeder capable of having the outlet for the discharge for the feed varied and further including a feed confiner capable of being revolved by the hogs to facilitate the discharge of the feed.

A further object of the invention is to provide, in a manner as hereinafter set forth, a feeder for the purpose referred to capable of being conveniently ported from point to point when desired.

A further object of the invention is to provide, in a manner as hereinafter set forth, a feeder for the purpose referred to including a vertically adjustable and automatically revoluble confiner for the feed.

A further object of the invention is to provide, in a manner as hereinafter set forth, a device for the purpose referred to capable of containing feed grain or ground feeds permanently open for discharge and capable of being adjusted to provide for the satisfactory discharge of the type of feed employed.

Further objects of the invention are to provide, in a manner as hereinafter set forth, a feeder for the purpose referred to which is comparatively simple in its construction and arrangement, strong, durable, compact, expeditiously adjusted when occasion requires, conveniently ported from point to point, thoroughly efficient in its use, capable of being employed for feed grain and ground feeds, readily set up and comparatively inexpensive to manufacture.

With the foregoing and other objects in view, the invention consists of the novel construction, combination and arrangement of parts as will be more specifically referred to and are as illustrated in the accompanying drawings wherein is shown an embodiment of the invention, but it is to be understood that changes, variations and modifications may be resorted to which fall within the scope of the invention as claimed.

In the drawings:

Figure 1 is an elevation of the feeder in accordance with this invention,

Figure 2 is a vertical sectional view upon an enlarged scale illustrating the cover in dotted lines in closed position and in dotted lines in open position, Figure 3 is a fragmentary view in vertical section upon an enlarged scale of the upper portion of the feeder.

Figure 4:
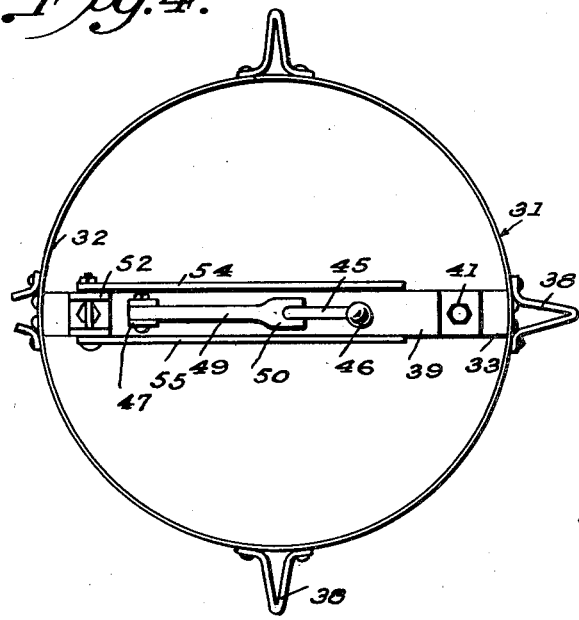
Figure 4 is an inverted plan of the confiner.

The feeder includes a base structure 8 of circular form consisting of a circular body portion 9, preferably constructed of wooden strips, a series of spaced supports 10 secured to the lower face of body portion 9 and a circular plate 11 positioned centrally of the upper face of the body portion 9 and formed with a bevelled edge 12.

Positioned on the body portion 9 and plate 11 is a feed pan 13 consisting of a rim 14 beaded at its top, as at 15, and a bottom 16 which is integral with the rim. The pan 13 is struck from sheet metal of the desired gauge and has its bottom 12 formed with an upstanding circular portion 17 formed with a bevelled edge 18. The top of the circular portion 17 is seated upon the top of plate 11 and the edge of portion 17 snugly engages the edge 12 of plate 11.

Arranged at the axis of the top of the portion 17 is an interiorly threaded collar 19 formed at its bottom with a laterally disposed annular apertured flange 20. The flange collar 19, pan 13, plate 11, body portion 9 and the central support 10 are hinged together by a holdfast structure generally indicated at 21. The lower face of the central support 10 is cut out as at 22 and at the top of the cutout is arranged the bottom of the holdfast structure 21.

Threadedly engaging at its lower end with the threads of the collar 19 is a hollow standard 23 of the desired length. The threads of the collar 19 coact with the threads 24 on the standard 23 for fixedly securing the latter with the base structure 8 and pan 13.

Fixedly secured to the top of the portion 17 of the pan 13 is a bracing structure 25 for the standard 23. The structure 25 includes at its upper end a collar for the passage of the standard 23. The latter in proximity to its upper end has secured therein, by the holdfast means 27 a plug 28 which constitutes an abutment for a purpose to be referred to.

Mounted on the bottom 16 of pan 13, encompassing the edge 18 of portion 17 and extending upwardly relative to pan 13 is a hollow conoidal-shaped member 29 formed at its top with an opening 30 for the passage of the standard 23. The member 29 constitutes a deflector for the feed.

Arranged above the pan 13 and of greater diameter than the member 29 is a feed confiner 31 which may be termed a tank and which is in the form of a cylinder 32 of the desired height and open at its upper and lower ends. Arranged within the cylinder 32 is a pair of superposed upper and lower brace members 33, 34 respectively having depending end terminal portions 35 which abut the inner face of cylinder 32 and are fixedly secured to the body of the latter by the holdfast means 36. The members 33, 34 at their centers thereof are formed with openings for the passage of the standard 23. The central opening of the brace member 33 is shown in Figure 3 and indicated at 37. Brace members 33, 34 revolve about the standard 23. Secured to the outer periphery of the cylinder 32 at the lower end thereof is a series of tapered projections 38 which are radially disposed with respect to the axis of cylinder 32 and preferably are arranged in equi-distant spaced relation.

Secured upon the upper face of the brace member 33 is an inverted U-shaped support 39 having its sides 40 formed with outwardly directed flanges 41 which are seated on brace member 33, as well as being fixedly secured to the latter by the holdfast means 42. The confiner 31 is vertically adjustable and with reference to Figure 3 confiner 31 is at the extent of its lowermost movement and when in such position support 39 seats on the upper end of the standard 23. The support 39 is formed centrally with a screw threaded opening 43 which threadedly engages a peripherally threaded rotatable bar 44 provided at its upper end with a crank arm 45 terminating in a handle 46. The bar 44 seats upon the plug 28 or in other words, the plug 28 provides an abutment for the lower end of the bar 44. When bar 44 is rotated in one direction the confiner 31 is elevated and when rotated in the opposite direction the confiner 31 is lowered. The lowering movement of the confiner is arrested when support 39 abuts the upper end of standard 23.

Carried by the support 39 is an apertured yoke 47 to which is pivoted, as at 48, one end of a latching member 49. The other end of member 49 is formed with a depending yoke 50 which functions to straddle the crank 45 to prevent rotatable movement of the bar 44 and to maintain the confiner 31 in its adjusted position. When the confiner 31 is in its lowermost adjusted position, the lower end of the confiner 31 is spaced above the pan 13. The confiner 31 is of less diameter than the diameter of the pan 13. The length of the projections 38 are such that they terminate at points inwardly adjacent the rim 14 of the pan 13. The projections 38 function to bodily revolve the confiner 31 and this action is caused by the head of the animal while feeding engaging with the projection thereby causing the confiner to revolve. The confiner is mounted so that it may be revolved in opposite directions.

Figure 5:
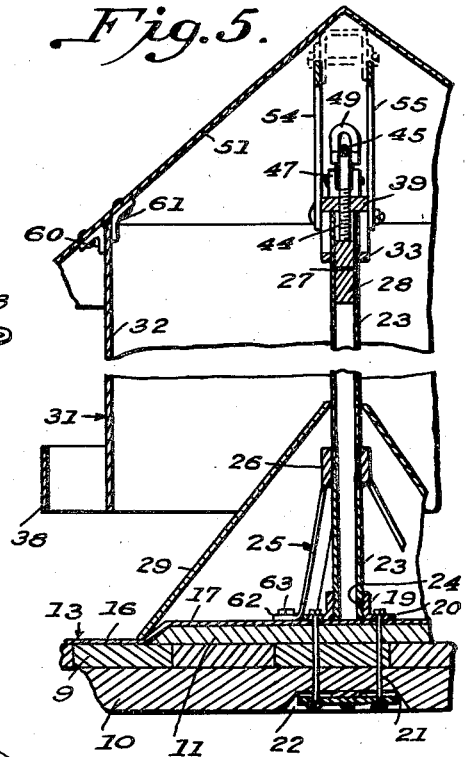
Figure 5 is a fragmentary view in vertical section with the confiner adjusted and taken at right angles to the showing of Figure 2.
Figure 6:
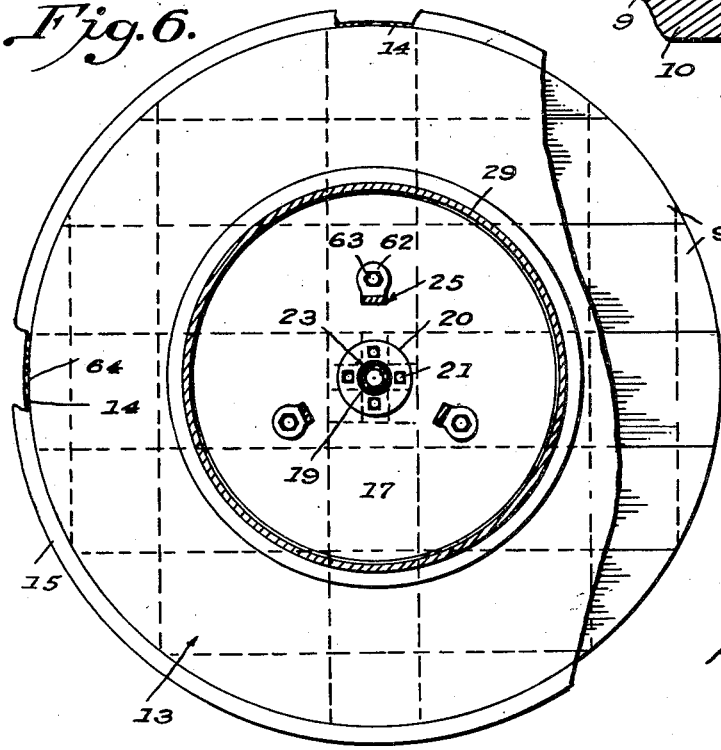
Figure 6 is a section on line 6—6, Figure 2, broken away.
Figure 7:
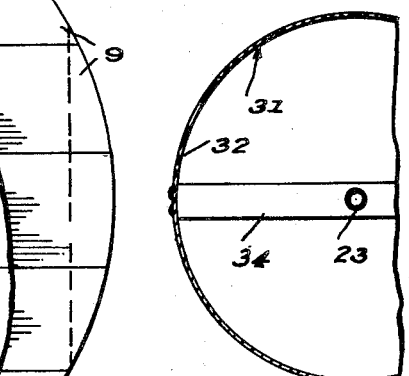
Figure 7 is a fragmentary view taken on line 7—7, Figure 2.

The feeder includes a hollow cone-shaped lid 51 having its lower end of greater diameter than the diameter of the cylinder 32. The lid when in closure position with respect to the upper end of the cylinder 32 seats upon the top edge of the cylinder (Figure 2). One of the flanges 41 of the support 39 has mounted thereon an upstanding yoke 52 secured in the position by the holdfast means 42 which anchors such flange to the brace member 33. The inner face of the lid 51 has secured thereto an inclined inverted yoke 53. Pivotally connected to one side of the yokes 52, 53 is a hinge member 54 in the form of a link and pivotally connected at its ends to the other side of the yokes 52, 53 is a hinge member 55 in the form of a link. The yokes 52, 53, members 55, 56 and the pivotal connection between members 55, 56 and yokes 52, 53 provide a hinge connection between the lid 51 and the support 39 whereby the lid 51 may be shifted to the dotted line position shown in Figure 2. The lid 51 has a handle member 56. The lid 51 has a lateral eye 57 carrying a hook 58. The latter is for engagement with an eye 59 on the outer face of the cylinder 32 for latching the lid 51 in closure position with respect to the upper end of the cylinder 32. The lid 51 has secured to its lower face two spaced pairs of guides. The pairs of the guides are diametrically opposed with respect to the lid 51. The guides of each pair will be in the form as shown in Figure 5 and are indicated at 60, 61. When the lid is closed the guides of each pair are positioned against the outer and inner faces of the upper portion of the cylinder 32 as shown in Figure 5 with respect to one pair of guides. The bracing structure 25 is formed with spaced flanges 62 at its lower end and through said flanges extend holdfast means 63 for anchoring the structure 25 to the pan 13. The rim 14 of pan 13 is formed with drainage openings 64 to provide for escape of water if the feeder is used in the open.

The confiner 31 together with the elements attached thereto may be lifted off of the standard 23. The member 29 not only functions as a feed deflector but also as what may be termed a feed cone. The member 29 is of such height as not to contact with the brace member 34 and it is prevented from shifting laterally with respect to the pan 13 as it normally encompasses the edge 18 of the portion 17 of pan 13.

The confiner 31 is vertically adjusted to provide in connection with the member 39 a discharge outlet for the feed and furthermore to maintain for a proper discharge of the feed depending upon the character of the latter.

What I claim is:

A feeder comprising a base pan, a tubular standard rising from said pan, a plug in said standard downwardly of the upper end thereof, a cylindrical member open at each end engaging about said standard, a bar extending diametrically across said member adjacent the upper end, said bar having a threaded opening coaxial with said standard, a threaded crank engaging through said opening loosely engaging in the upper end of said standard for engagement with said plug whereby said member may be vertically adjusted relative to said standard, the upper end of said standard being engageable with said bar to limit the movement of the bar in one direction, a lid engaging over the upper end of said member and enclosing said crank, means hingedly securing said lid to said bar, a U-shaped latching yoke, and means pivotally securing said yoke to said bar in a position for engagement with said crank to thereby hold said crank against rotation relative to said bar.

ALBERT AMSTUTZ.